Figure 1:
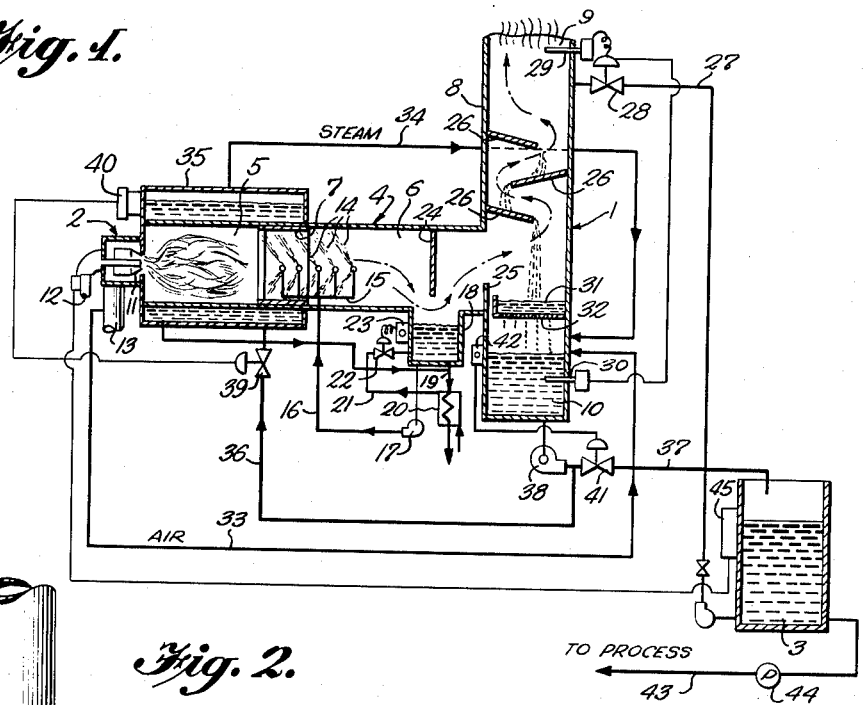

Sept. 7, 1965  R. P. NEWTON, JR  3,204,629
WATER HEATER

Filed June 14, 1963  2 Sheets-Sheet 1

INVENTOR
*Robert P. Newton, Jr.*

BY
*Mason, Fenwick & Lawrence*
ATTORNEYS

INVENTOR
Robert P. Newton, Jr.

United States Patent Office 3,204,629
Patented Sept. 7, 1965

3,204,629
WATER HEATER
Robert P. Newton, Jr., P.O. Box 506, Orangeburg, S.C.
Filed June 14, 1963, Ser. No. 288,042
16 Claims. (Cl. 126—355)

This invention relates to water heaters, and more particularly to water heaters adapted primarily for industrial use.

In heating water by a direct heating system, that is by direct contact of the water with a flame and/or flue gases, there have been serious problems in obtaining sufficiently high temperature water, in obtaining heated water free from contamination and suitable for use in some processes, and in obtaining high efficiency in the heating unit. In some instances, substantial pressure drops occur in the system requiring high-powered equipment to maintain circulation.

The general object of the present invention is to provide a water heater which will have high efficiency and develop high temperature, contamination free, process water.

A more specific object of the invention is to provide a water heater wherein water to be heated is flowed in countercurrent to escaping flue gases to extract heat from the flue gases.

Another object is to preliminarily heat water by flowing the water in countercurrent to escaping flue gases and raising the preheated water temperature by injection of high temperature water, or steam, which high temperature water or steam is obtained through heat exchange at the combustion area of a firing means.

A further object is to provide means to quench and wash hot combustion gases to produce a pure steam and flue gas combination into which water to be heated is introduced, with the quenching and washing means including recirculated water sprays.

Yet another object is to provide a water heater wherein the water to be heated is in direct contact with flue gases but all contamination is removed to produce clear process water.

Other objects of the invention will appear from the following description of practical embodiments thereof, when considered together with the drawings which accompany, and form part of, this specification.

Figure 2:
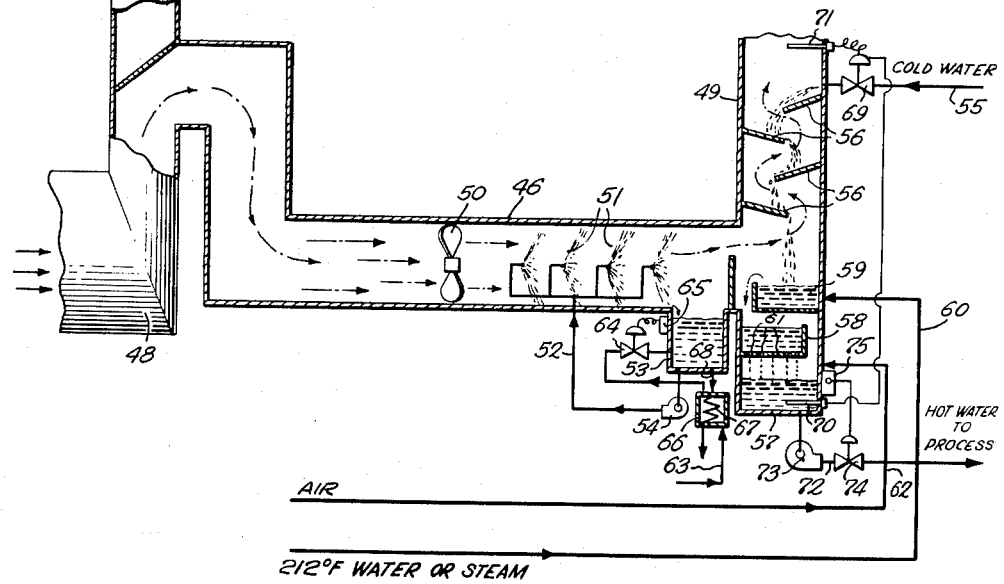
Figure 3:
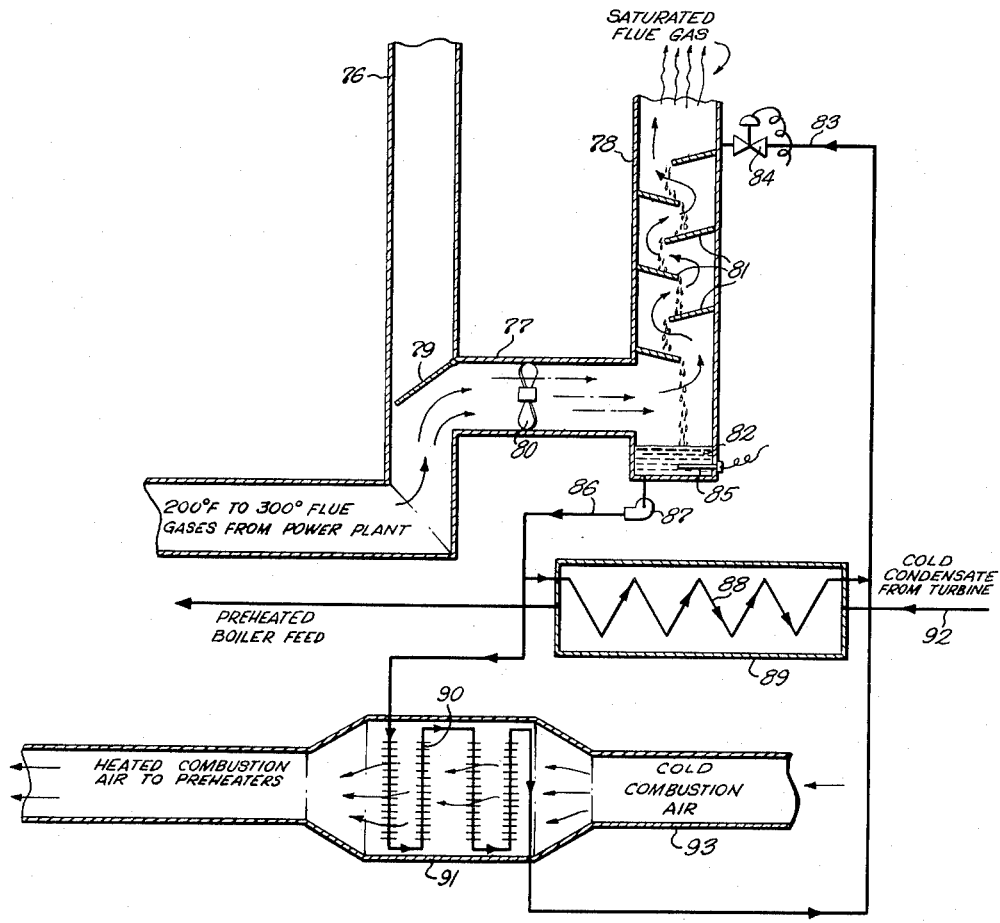

In the drawings:

FIGURE 1 is a diagrammatic showing of one form of the present invention which is a direct fired unit; and FIGURE 2 is a diagrammatic illustration of another form of the invention, which utilizes an existing boiler, or other combustion source, for a supply of heating gases.

In general, the present invention contemplates introducing water to be heated into the top of a heat recovery stack from which combustion gases are escaping, and permitting the water to flow down the stack in counterflow to the escaping gases to absorb the heat of the gases. In some instances, 212° water, or steam, is injected into the heated water to raise its temperature. When the heated water is to be used as process water, the hot combustion gases are first quenched and washed by recirculated water sprays, and the heated process water passes through a degasser to remove carbon dioxide and oxygen before the water enters the process lines.

Referring first to FIGURE 1, there is shown a heater 1 for process water which includes its own burner 2 as a part of the unit. Heated water is stored in a tank 3, and the burner operation is controlled by the level of hot water in the tank.

The heater unit has the burner 2, mounted in the end of a burner tube 4, which includes a combustion chamber 5 at the burner end in open communication with a gas flue 6. The tube may have an inner liner 7 adjacent the juncture of the combustion chamber and gas flue in the area where flash steam may occur from the sprays to be described. The tube opens into a vertical heat recovery stack 8, near the bottom of the stack, which stack is open at its top 9 to permit the free escape of combustion gases. Stack 8 has a water collecting chamber 10 in its foot, below the connection to the burner tube.

The burner 2 can be of any desired type, and is shown as having its tip, or jet, 11 at the center of the end wall of the combustion chamber of the burner tube, so that its flame will be directed axially into the combustion tube. The burner is fed by a fuel line 12 and combustion is supported by air under pressure supplied from a suitable source (not shown) through line 13.

In order to quench the burner flame and to cleanse the combustion gases, a group of spray heads 14 are arranged within the burner tube. The first several of these spray heads are positioned within the tube liner 7, and the remainder are within the gas flue 6. Those spray heads within the liner are in the area of most intense heat. The spray heads are supplied with water from a manifold 15, fed by line 16. A pump 17 moves water through the line. The spray emitting from the spray heads within the liner will flash into steam, at the same time quenching the burner flame and removing sulphur from the combustion gases. The spray from the other spray heads will cool the gases and wash them to remove impurities. By reason of this water spray into the combustion and flue areas, pure steam and washed gas will emerge from the burner tube to travel up the recovery stack. The spray water which does not become steam falls to the bottom of the tube and drains into a sump 18 depending from the tube bottom. Water line 16 leads from the bottom of 18 so that the spray water is recirculated. By recirculating the spray water, no cold water is sprayed into the combustion area, and the quenching and cleansing water is kept separated from the process water. Only pure steam generated from the spray water travels with the flue gases.

An outlet 19 from sump 18 permits automatic and continuous blowdown of the cleansing water. Blowdown line 19 provides a heat source for preheating makeup water for the spray system. To this end, a heat exchange chamber 20 encloses a section of the blowdown line, and makeup water enters the chamber and passes to the sump through makeup line 21. Line 21 has an automatic valve 22, controlled by a level-control 23 mounted on the side of the sump. Thus, preheated makeup spray water is supplied automatically as required to maintain the recirculating system at full capacity.

A baffle 24 covers the major portion of the burner tube flue above the sump, to cause the escaping steam and flue gases to move downwardly over the sump and make a direction change to aid in separating free spray water from the steam and flue gases before they enter the recovery stack. A second baffle 25 at the base of the flue at its juncture with the stack directs the gases upwardly. A series of inclined baffles 26 are arranged alternately on opposite sides of the recovery stack and cause the steam and flue gases to follow a tortuous path upwardly.

A cold water supply line 27 enters the recovery stack 8 near its top. A valve 28 governs the flow of water to the heater, and the valve is controlled by a thermostat 29 responsive to flue gas temperature adjacent the stack top, and a thermostat 30 responsive to process water temperature in the collection chamber. The operation of these controls will be described later. Water flowing from supply line 27 will enter directly the rising column of saturated flue gases and descend the stack 8 in counterflow to the gases. The water will fall upon the uppermost baffle 26, flow down it, and cascade from baffle to baffle, picking up the heat from the ascending gases. Thus, the cold water first contacts the escaping gases at their coolest point, and, as the water warms, it contacts gases of progressively higher temperature. In this way, the greatest possible amount of heat is absorbed from the gases.

When the downwardly flowing water drops from the lowermost baffle 26, it falls into a degasser tray 31. The degasser has a perforated bottom 32 which serves to allow the water to pass from the degasser to the collection chamber and, at the same time, breaks up the water particles to aid in removing oxygen and carbon dioxide from the water. In order that the water dripping from the degasser may fall into an air atmosphere rather than a carbon dioxide atmosphere, air in small quantities is introduced into the stack just below the degasser. This is accomplished by running an air line 33 from the burner air line 13 to the stack.

The water in the degasser, and that falling from the degasser into the collection chamber is given a temperature boost by the admission of steam, or a mixture 212° steam and 212° water, to the stack at a point below the degasser. This is done by means of a pipe 34 which opens through the stack wall and is connected at its opposite end to the top of a jacket 35, surrounding the combustion chamber section of the burner tube. Jacket 35 is fed through line 36, which extends from a process water delivery line 37 from the collection chamber 10 to the storage tank 3. There is a pump 38 in line 37 between the collection chamber and the connection of line 36 which serves to force the water through the two lines. A valve 39 in feed line 36 governs the admission of water to the jacket. Valve 39 is actuated by a level control 40 mounted on the jacket to ensure a constant water level in the jacket.

The admission of the steam, or water and steam, from the jacket into the area where water is dripping from the degasser will result in quick absorption of the heat by the cooler water in the degasser and a raising of the water temperature. If the jacket is used simply as a boiler, and steam only is admitted to the area below the degasser, iron contamination can be eliminated from the process water even though the combustion chamber is fabricated from iron.

Process water from the collecting chamber 10 is carried to tank 3 through line 37 at the rate it accumulates in the chamber. The flow rate through line 37 is governed by a valve 41, which is operated by a level control 42 on the stack at the collecting chamber. Water is supplied to the process from the tank through line 43 by pump 44.

A level control 45 is mounted on tank 3, to govern the operation of burner 2 to insure a supply of heated process water in accordance with requirements. As the water level lowers in the tank, the burner will be turned on, and when the water reaches a predetermined maximum, the burner will be cut off. It is obvious that the control 45 may provide for intermediate burner operating rates between the full on and off positions.

The incoming make-up water is controlled primarily by the thermostat 30 in the wall of the water collecting chamber 10. If the temperature in the chamber rises, valve 28 opens allowing water to flow in from supply line 27. Valve 28 is controlled also by the secondary control thermostat 29 which senses gas temperature adjacent the stack outlet. If the temperature of the escaping gases gets too high, valve 28 opens to admit cold make-up water to absorb the heat and bring the gas temperature down to a predetermined level.

It will be seen that cold water (the make-up water) first contacts the lowest temperature gas in the system, that gas which is escaping from the stack. In this way the utmost heat extraction is possible and maximum advantage is taken of the heat exchange possibilities. Only washed gas and steam contact the incoming water to heat it to maintain the water in an uncontaminated condition. Only hot water contacts the burner flame due to the recirculation of spray water. Excess flame heat is used to heat jacketed water to produce steam for injection into the system just prior to collection of the heated water and in an area where the water is free falling for quick absorption. At no time is there contact between the water of the cleansing sprays and the process water.

In FIGURE 2, a system very similar to that just described is illustrated, but the primary heat source is the escaping gas from an existing boiler. In this arrangement, the water jacket is eliminated as the flue gases entering the system are at a much lower temperature than the gases from the burner of the system of FIGURE 1.

In the system of FIGURE 2, a flue chamber 46 conducts flue gases from a stack 47 on an existing boiler system 48 to the stack 49 of the heater. A fan 50 may be used to draw the gases from the boiler stack and force them through chamber 46 and out through stack 49.

Spray heads 51 are mounted in the chamber 46 to quench the gases and to wash them. The spray heads are fed through line 52 from a sump 53 opening in the bottom of chamber 46 to collect water from the sprays. Water is circulated for spraying by pump 54. As before, some of the sprayed water will become steam to heat incoming water in the stack 49.

The stack 49 is very similar to the one previously described. It has a water inlet pipe 55 entering near its top, and a plurality of declining baffles 56 arranged along its sides to cause the incoming water to cascade from one baffle to another and to provide a tortuous upward path for escaping gases and steam. There is a collection chamber 57 at the base of stack 49 with a degasser tray 58 above it. A heat-up chamber 59 is located above the degasser. Water flowing down the stack falls into the heat-up chamber where steam is injected into it. The steam enters through pipe 60 from an outside source, usually the boiler. Water overflows the chamber 59 and drops into the degasser tray 58. As water drips through the openings 61 in the bottom of the degasser tray it is aerated by a stream of air under pressure entering the degasser chamber through pipe 62 from a suitable outside source.

The spray water has a make-up water supply line 63, controlled by valve 64, operated by level control 65 on the sump. The make-up spray water is preheated, as before, by passing through heat exchange chamber 66 which contains coil 67 in the blow down line 68 from the sump.

Make-up water entering the stack through pipe 55 is controlled by valve 69 operated by a primary control thermostat 70 on the collection chamber 57, and a secondary, over-control thermostat 71 at the top of the stack. Process water is drawn from collection chamber 57 by line 72 and pump 73. A valve 74, operated by level control 75 on chamber 57, controls flow of process water through line 72.

The system shown in FIGURE 2 operates in substantially the same manner as does the system of FIGURE 1 and no detail description of its operation is required.

While several practical embodiments of the invention have been disclosed, it will be apparent that the details of structure shown and described are merely by way of example, and the invention may take other forms within the scope of the appended claims.

What is claimed is:

1. A water heater comprising, a vertical stack, a flue chamber having an open outlet end in communication with the stack near the base of the stack, whereby hot flue gases may pass through the flue chamber and up the stack, means to supply water to be heated to the top of the stack, baffles arranged in staggered relation in the stack between the means to supply water and the flue chamber outlet to cause incoming water to cascade downwardly along a serpentine path in countercurrent to flue gases rising in the stack to absorb the heat of said gases, a collection chamber for heated water in the base of the stack below the flue chamber outlet, spray heads in the flue chamber arranged to quench and cleanse flue gases passing through the flue chamber, means to supply water to the spray heads, and a sump opening to the flue chamber to collect cleansing water sprayed into the flue chamber by the spray heads, the means to supply water to the spray heads including a line from the sump, whereby the spray water is preheated and recirculated.

2. A water heater as claimed in claim 1 wherein there is a makeup water supply line to the sump, and a blow-down line from the sump, with the makeup water and blow-down lines arranged in heat exchange relation to preheat the makeup water prior to entry into the sump.

3. A water heater as claimed in claim 1 wherein there is a degasser chamber above the collection chamber into which water cascading down the stack falls, the degasser chamber having a perforated bottom to permit water in the degasser to drip into the collection chamber.

4. A water heater as claimed in claim 3 wherein there is an air line opening into the stack between the degasser chamber and collection chamber.

5. A water heater as claimed in claim 4 wherein there is a steam line opening to the stack above the collection chamber.

6. A water heater as claimed in claim 4 wherein there is a tray in the stack above the degasser to catch water cascading down the stack for overflow into the degasser chamber, and there is a steam line entering the tray.

7. A water heater comprising, a vertical stack, a flue chamber having an open outlet end in communication with the stack near the base of the stack, a burner in the opposite end of the flue chamber from the outlet, means to supply water to the stack near the top, baffles arranged in staggered relation in the stack between the means to supply water and the flue chamber outlet to cause incoming water to cascade downwardly along a serpentine path in counter current to flue gases from the burner passing through the flue chamber and up the stack, a collection chamber for heated water in the base of the stack, a jacket about a portion of the flue chamber adjacent the burner, means to feed water from a source of supply to the jacket, and means to carry steam from the jacket to the stack above the collection chamber.

8. A water heater as claimed in claim 7 wherein there are spray heads in the flue chamber to quench and cleanse flue gases from the burner, and means to supply water to the spray heads.

9. A water heater as claimed in claim 8 wherein there is a sump opening to the flue chamber to collect cleansing water sprayed into the flue chamber by the spray heads, the means to supply water to the spray heads including a line from the sump, whereby the spray water is preheated and recirculated.

10. A water heater as claimed in claim 7 wherein the source of supply for water to the jacket is the collection chamber.

11. A water heater as claimed in claim 9 wherein the source of supply of water to the jacket is the collection chamber.

12. A water heater as claimed in claim 11 wherein there is a makeup water supply line to the sump and a blow-down line from the jacket and the sump, with the makeup water and blow-down lines arranged in heat exchange relation to preheat the makeup water prior to entry into the sump.

13. A water heater comprising, a vertical stack, a flue chamber having an open outlet end in communication with the stack near the base of the stack, a burner in the opposite end of the flue chamber from the outlet, means to supply water to the stack near the top, baffles arranged in staggered relation in the stack between the means to supply water and the flue chamber outlet to cause incoming water to cascade downwardly along a serpentine path in counter current to flue gases from the burner passing through the flue chamber and up the stack, a collection chamber for heated water in the base of the stack, spray heads in the flue chamber to quench and cleanse flue gases from the burner, a sump in the flue chamber to collect cleansing water sprayed in the flue chamber, a line from the sump to the spray heads, whereby heated spray water is recirculated, a jacket around a portion of the flue chamber adjacent the burner, means to feed heated water to the jacket from the collection chamber, means to supply preheated makeup water to the spray heads and the jacket, and a degasser chamber about the collection chamber into which water cascading down the stack falls before entering the collection chamber.

14. A water heater as claimed in claim 13 wherein there is a line from the jacket to the stack entering the stack in the area of water passage from the degasser to the collection chamber to carry steam from the jacket to the water passing from the degasser to the collection chamber, and an air line entering the stack adjacent the steam line from the jacket.

15. A water heater as claimed in claim 14 wherein there is a storage tank for hot water, a valved line from the collection chamber to the storage tank, and a level control on the collection chamber to control the valved line.

16. A water heater as claimed in claim 15 wherein there is a level control on the storage tank, and means connecting the level control on the storage tank to the burner to control burner operations in accordance with the level of heated water in the storage tank.

References Cited by the Examiner

UNITED STATES PATENTS

| | | | |
|---|---|---|---|
| 1,527,740 | 2/25 | Lipshitz | 126—359 |
| 2,217,375 | 10/40 | Miller | 122—451.1 |
| 2,629,551 | 2/53 | Audino | 122—451.1 |
| 2,759,328 | 8/56 | Cockrell | 126—359 X |
| 2,921,004 | 1/60 | Wood | 126—350 X |

JAMES W. WESTHAVER, *Primary Examiner.*

ROBERT A. DUA, *Examiner.*